June 22, 1965 E. H. BRYANT, JR 3,190,962

MAGNETIC CALL TOTALIZER

Filed June 20, 1962 2 Sheets-Sheet 1

INVENTOR
ELLIS H. BRYANT, JR.

BY Watson, Cole, Grindle & Watson

ATTORNEYS

MAGNETIC CALL TOTALIZER

Filed June 20, 1962 2 Sheets-Sheet 2

INVENTOR
ELLIS H. BRYANT, JR

BY Watson, Cole, Grindle & Watson
ATTORNEYS 3,190,962

MAGNETIC CALL TOTALIZER

Ellis H. Bryant, Jr., Atlanta, Ga., assignor to Audichron Company, Atlanta, Ga., a corporation of Georgia Filed June 20, 1962, Ser. No. 203,787
1 Claim. (Cl. 179—8)

Figure 1:
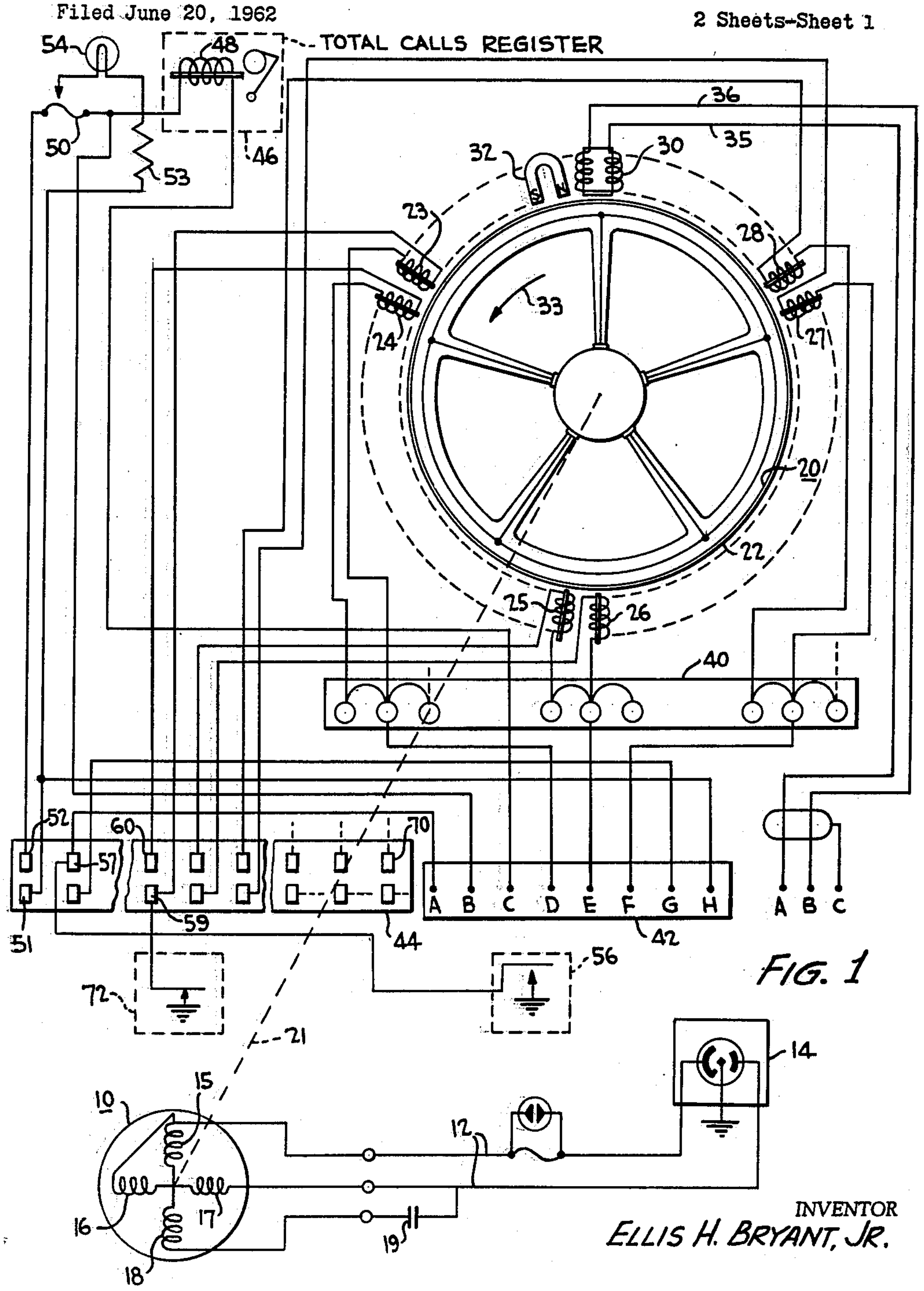

This invention relates to magnetic storage and readout systems and more particularly to a system for storing information on a magnetic medium and for reading out this information and totalizing the information. This type of equipment might be employed with the time temperature announcing machine disclosed in application Ser. No. 845,392, filed October 19, 1959, now Pat. No. 3,161,729, and other similar announcing systems, to total the calls answered.

It is known in the art to employ magnetic storage devices such as magnetic drums, or closed loop magnetic belts, for the purpose of storage of information. It is also known to store the information in parallel on a single track of the magnetic medium and to read out the information from the single track. I have discovered, however, that this basic concept of storage and readout can be employed in a telephone answering system to record the number of calls being answered by the system and to totalize these calls.

Accordingly, it is an object of this invention to provide an improved answering magnetic call totalizer system.

It is another object of this invention to provide an improved telephone line condition information storage and readout system in which the condition of a plurality of circuits is sequentially determined and the information regarding this condition is substantially simultaneously recorded on a medium and is serially read out of the medium to deliver a total indicating signal, which signal is indicative of the total number of lines in a predetermined condition.

Briefly, in accordance with aspects of this invention, an endless belt, or magnetic drum type of storage medium, is employed with a plurality of recording heads positioned around the drum in a single plane and a readout head positioned in this same plane adjacent the drum to detect or read out the information stored by all of the recording heads. Advantageously, each of the recording heads is coupled to a different one of a plurality of telephone answering trunks. At the start of the announcing cycle a switch is operated for a very short interval to operate a first relay which inactivates the totalizer amplifier and thereby prevents superfluous registrations. This pulse also operates a second relay which causes a number of capacitors to become charged. At the end of the pulse the second relay releases and discharges the capacitors through groups of magnetic recording heads. These heads are individually connected to announcing trunks, which trunks are to be connected to subscriber lines when the subscriber dials the proper number. Thus, the pulse caused by the discharge of the capacitors passes through the recording heads connected to the respective subscriber grounds and causes one bit or digit of information to be stored on the magnetic medium adjacent the associated recording head, thus indicating a call being answered. As the magnetic drum is constantly rotating, each of these digits of information passes beneath a single readout head where the stored information is read out and fed to an associated amplifier. The associated amplifier, which advantageously is a plurality of stages of transistor amplifiers, has its output connected to a totalizing relay which indicates the total number of pulses or digits read out of the drum and thus indicates the total number of calls being answered by the telephone answering trunks.

Figure 2:
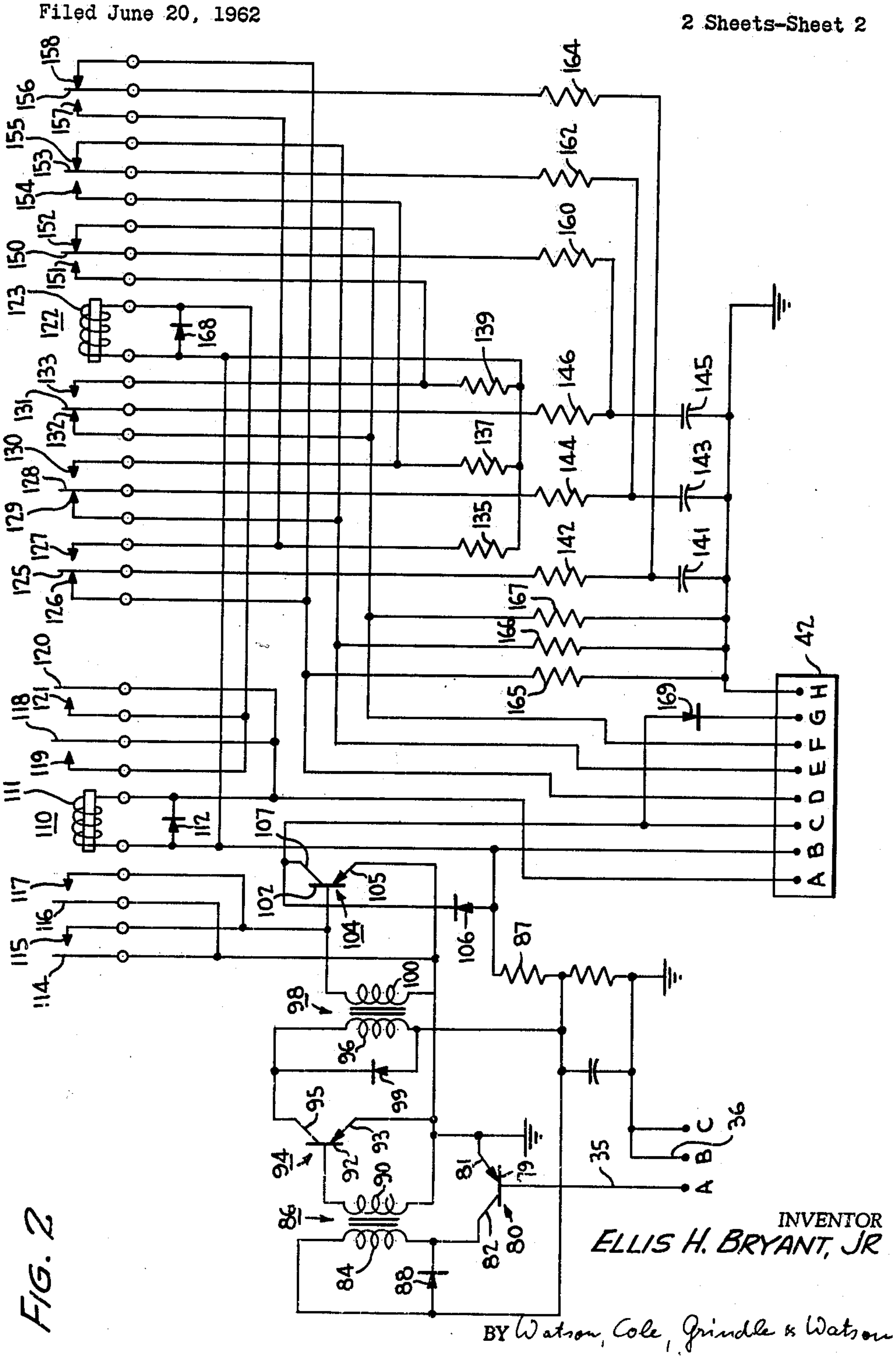

These and various other objects and features of the invention will be more clearly understood from a reading of the detailed description of the invention in which:

FIG. 1 is a combined pictorial and schematic diagram of a portion of one illustrative embodiment of this invention; and FIG. 2 is a schematic diagram of another portion of the illustrative embodiment of FIG. 1.

Referring now to FIG. 1, there is depicted a motor 10 which is connected by means of a cable 12 to a suitable power source 14. The motor includes a number of stator windings 15, 16, 17 and 18. Winding 18 is connected by means of a capacitor 19 to one line of cable 12, which combination acts as a phase shift device to provide starting torque for the motor. A drum 20 is mechanically connected to the motor as indicated by the dotted line 21 to be driven thereby. The drum includes a belt or covering of magnetic material 22, such as magnetic oxide, which may be readily magnetized in one direction and reversed and saturated in the opposite direction. A plurality of recording heads 23, 24, 25, 26, 27, and 28 are positioned adjacent the periphery of the belt 22 and positioned in a single plane so that all of these recording heads record information on a single track. Although only a few recording heads are shown, in actual practice a large number are employed; for example, 100 heads may be located in a single plane to record on a single track. A pickup, or readout head 30 is positioned adjacent the magnetic belt 22 in the same plane as the recording heads and this pickup head is connected to an amplifier which will be described in conjunction with FIG. 2. Adjacent the readout head is an erasing device 32 which, in this particular instance, is a permanent magnet. Because the drum 20 is rotating in a counterclockwise direction as indicated by the arrow 33, the information recorded on the drum by the recording heads, such as 23 through 28, will be serially read out by the readout head 30 and fed in the form of pulses over conductors 35 and 36 to the amplifier of FIG. 2 which will be subsequently described. After each of the pulses, or stored information, has been read out by the readout device 30, it is erased by means of the erasing device 32 when the stored bit passes under head 32.

Terminal strips 40, 42, and 44 are employed for the termination of various conductors of the system as will be subsequently described. Each of the recording heads includes an inductance, one terminal of which is connected to terminal strip 40 and the other terminal of which is connected to terminal strip 44. A total calls register 46 including a relay 48 has its winding connected to terminal strip 42 at terminal C. The other end of the relay winding is connected through fuse 50 to terminal 52 on terminal strip 44. Advantageously, the negative terminal of a battery such as a 48-volt Edison cell is connected to terminal 52 of terminal strip 44. The battery ground is connected to terminal 51 of terminal strip 44 and to the opposite side of fuse 50 through a resistor 53. A fuse indicator 54 is provided with fuse 50 to give a visual indication when fuse 50 burns out. Switch 56 is operatively associated with the announcing machine, such as disclosed in application Ser. No. 845,392, now Pat. No. 3,161,729, to be closed at the start of each announcing cycle. This switch has one side connected to ground and the other side connected to terminal strip 44 at terminal 57. Terminal 57 is connected to terminal A of terminal strip 42. Terminals 59 through 70 are connected to individual announcing trunks (not shown) and when an announcing trunk is in operation a circuit is completed to ground through a switch, such as switch 72, shown connected to terminal 59 and the subscribers loop.

Referring now to FIG. 2, there is depicted in schematic form the remaining circuit of the embodiment of FIG. 1. As therein depicted, conductor 35 in the lower lefthand corner is connected to the base 79 of transistor 80 while the emitter 81 is connected to ground. The collector 82 is connected through the primary winding 84 of a transformer 86 and a resistor 87 to terminal B of terminal strip 42. It is to be noted that terminal B is connected to negative battery through the fuse 50, shown in FIG. 1. Thus, a negative potential is applied to the collector 82 at all times. A clipping, or limiting, diode 88 is connected in parallel with primary winding 84 to limit the reverse voltage amplitude when the pulses applied across the primary winding 84 are removed. The secondary winding 90 of transformer 86 has one terminal connected to the base electrode 92 of transistor 94 and the other terminal is connected to the emitter electrode 93, the emitter electrode being grounded. Collector electrode 95 is connected to the primary winding 96 of transformer 98. The other terminal of primary winding 96 is connected to one terminal of resistor 87 to supply negative potential to collector 95 from terminal 13 of terminal strip 42. A pulse limiting diode 99 is connected across primary winding 96. The secondary winding 100 of transformer 98 is connected to base 102 of transistor 104. The emitter electrode 105 is connected to the other terminal of secondary winding 100 and to ground. A pulse limiting diode 106 is connected between the collector electrode 107 of transistor 104 and the negative battery terminal B on terminal strip 42. A relay 110 has its winding 111 connected between terminals A and B of terminal strip 42 and this relay winding will be energized at the start of each announcing cycle by the application of ground and negative battery to terminals A and B respectively, through the operation of switch 56, shown in FIG. 1. A limiting diode 112 is connected across winding 111 of relay 110 to limit the reverse voltage amplitude when the pulse applied to the relay winding 111 is removed. Relay 110 includes a pair of armatures 114 and 116, each having an associated stationary contact 115 and 117, respectively. When relay 110 is actuated at the start of each announcing cycle, in a manner previously explained, armatures 114 and 116 engage their stationary contacts 115 and 117 to short circuit the secondary winding 100 of transformer 98 to prevent superfluous registrations. Relay 110 also includes armatures 118 and 120, each having an associated stationary contact 119 and 121, respectively. The system includes relay 122 having a winding 123. One terminal of winding 123 is connected to one terminal of winding 111 of relay 110, the other terminal of winding 123 is connected to stationary contacts 119 and 121. Armatures 118 and 120 are connected to the other terminal of winding 111 and, accordingly, when relay 110 is actuated, armatures 118 and 120 engage their respective stationary contacts 119 and 121, thus connecting winding 123 in parallel with winding 111.

Relay 122 includes a first group of armatures 125, 128, and 131. Armature 125 has a pair of stationary contacts 126 and 127. Armature 128 has a pair of stationary contacts 129 and 130, while armature 131 has stationary contacts 132 and 133 operatively associated therewith. Stationary contacts 127, 130, and 133 are connected to terminal B of strip 42 through individual resistors 135, 137, and 139, respectively. Armatures 125, 128, and 131 are connected to capacitors 141, 143, and 145, respectively, through resistors 142, 144, and 146, respectively. The opposite terminals of these capacitors are connected to ground and to terminal H on strip 42.

Relay 122 has a second set of armatures 150, 153, and 156 operatively associated therewith. Armature 150 has a pair of stationary contacts 151 and 152. Armature 153 has a pair of stationary contacts 154 and 155 operatively associated therewith. Armature 156 has a pair of stationary contacts 157 and 158 operatively associated therewith. It is to be noted that relays 110 and 122 are shown in their normal, or released, condition. When these relays are operated, each of the armatures are actuated toward their respective windings. Armatures 150, 153, and 156 are connected to capacitors 145, 143 and 141, respectively, through resistors 160, 162, and 164, respectively.

At the start of the announcing cycle, a ground is applied by switch 56, shown in FIG. 1, which applied ground to terminal A of strip 42 and thereby actuates relay 110 which, in turn, actuates relay 122 through the parallel connected armatures 118 and 120. When relay 122 operates, negative battery from terminal B of strip 42 is applied through resistors 135, 137 and 139, stationary contacts 127, 130 and 133, resistors 142, 144 and 146 to charge capacitors 141, 143, 145. The capacitors are also charged through the parallel connected stationary contacts 151, 154 and 157 which are connected in parallel with the above mentioned stationary contacts. This charging path includes armatures 150, 153 and 156 and resistors 160, 162 and 164. Because the switch 56 remains closed for only a short interval, for example, one-half second, relays 110 and 122 are released at the end of this short interval. At the end of this interval, relay 122 releases and connects the now charged capacitors to stationary contacts 126, 129 and 132, respectively, which are connected in parallel with stationary contacts 158, 155 and 152, respectively. Capacitors 141, 143 and 145 therefore discharge through the resistors 142, 144 and 146 and the parallel connected resistors 160, 162 and 164 into terminals D, E and F of terminal strip 42, which terminals are connected to groups of recording heads at terminal strip 40, shown in FIG. 1. If the other terminal of any of the recording heads is connected to ground through an answering trunk which is in operation, as is indicated by switch 72 in FIG. 1, then the associated recording head, such as head 23 in the example given, will be energized by the pulse delivered from the charged condenser. In this particular instance, condenser 141 discharges through terminal D on strip 42 into the first collector group terminal on strip 40 and the winding of recording head 23. Thus, the magnetic oxide material on belt 22 will be reversed in polarization and this reversal will be detected by the readout head 30 when the drum 20 rotates to a position in which the recorded bit of information passes adjacent the readout head 30. This pulse, or bit of information, is fed over conductors 35 and 36 and is amplified by transistor amplifiers 80, 94 and 104. The output pulse is fed from terminal C on strip 42 to actuate relay 48 of the total calls register 46. Because relay 48 is of the stepping type, each successive bit of information detected by the readout head 30 causes the relay 49 to step one notch and to advance the associated register one digit. It is, of course, understood that any other form of totalizer could be employed to produce the desired results.

It is to be noted that relay 110 has a slow release characteristic and, accordingly, remains operated for a predetermined period after the operation and release of switch 56 and after the release of relay 122. While the relay 110 is operated, the transistor amplifier is short circuited, thus preventing any undesired storage of information on the magnetic counter. When relay 110 releases, which will take place, in a period of the order of one-tenth of a second after the switch 56 is opened, the amplifier is reactivated.

Capacitors 141, 143 and 145 have a relatively large capacity so that they may store a sufficient charge to transmit current to a number of recording heads effectively connected in parallel. In other words, one capacitor may discharge into a group of ten recording heads and current will be conducted through those heads which are associated with an answering trunk which is in use in the announcing system. Resistors 165, 166, and 167 discharge capacitors 141, 143, 145 during cycles when no registrations are made. False registrations would occur as soon as a line unit grounded the circuit of the associated head after the current pulse, without these resistors. Diode 169 is an isolation unit for the remote register. Diode 168 is for pulse suppression.

It is further understood that while a magnetic drum storage arrangement has been disclosed, other forms of parallel storage and series readout may be employed. For example, a shift register type storage might be employed and the moving parts thereby eliminated.

While I have shown and described one illustrative embodiment of this invention, it is understood that the concepts thereof could be applied to other embodiments without departing from the spirit and scope of this invention.

What is claimed is:

A cyclic device for periodically recording and reading out the status of a plurality of telephone lines over a single announcing cycle when selectively actuated, comprising in combination a continuously moving magnetic recorder having a single cyclically repeating movable recording track, a plurality of recording members positioned along said track, a plurality of telephone lines coupled respectively to ones of said recording members, a read out member along said track to read out information stored by all said recording members responsive to movement of said track, an erasing member for clearing recorded information from said track after passing by said read out member, momentarily operable means for initiating the announcing cycle including means charging a capacitor coupled to a plurality of said recording members and subsequently operable for storing at different locations on said track through the corresponding recording member a digital signal from said charged capacitor for each telephone line in use, means totalizing the recorded digital signals read by said read out member during said announcing cycle, and said means for initiating said announcement cycle of operation of recording and reading out from said magnetic recorder including means inactivating the totalizing means during the period of charging said capacitors.

References Cited by the Examiner

UNITED STATES PATENTS

| | | | |
|---|---|---|---|
| 2,194,072 | 3/40 | Humphries | 179—8.6 |
| 2,850,571 | 9/58 | Bray et al. | 179—7 |
| 2,869,964 | 1/59 | Mitchell et al. | 179—7 |
| 2,909,608 | 10/59 | Callaway et al. | 179—8.6 |
| 2,976,365 | 3/61 | Young | 179—8.6 |
| 3,003,691 | 10/61 | Strandberg | 235—92 |

MALCOLM A. MORRISON, *Primary Examiner.*